Feb. 14, 1950 E. TOTH 2,497,103

NOISE REDUCING NETWORK

Filed June 7, 1945

Inventor
EMERICK TOTH

By Ralph L. Chappell
Attorney

Patented Feb. 14, 1950 2,497,103

UNITED STATES PATENT OFFICE 2,497,103

NOISE REDUCING NETWORK

Emerick Toth, Takoma Park, Md.

Application June 7, 1945, Serial No. 598,192

2 Claims. (Cl. 250—20)

(Granted under the act of March 3, 1883, as amended April 30, 1928; 370 O. G. 757)

This invention relates to the problem of noise interference on amplitude modulated signals, and is particularly directed to the problem of separating keyed continuous wave impulses from high amplitude noise impulses embodying substantially a continuous frequency spectrum.

It is accordingly an object of the invention to eliminate high level noise impulses from a desired signal.

Figure 1:
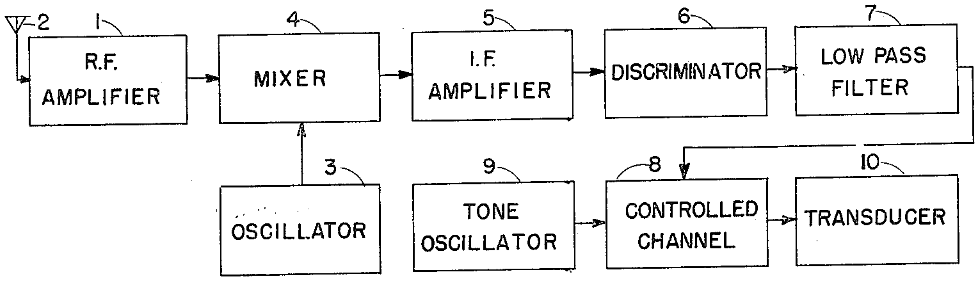
Figure 2:
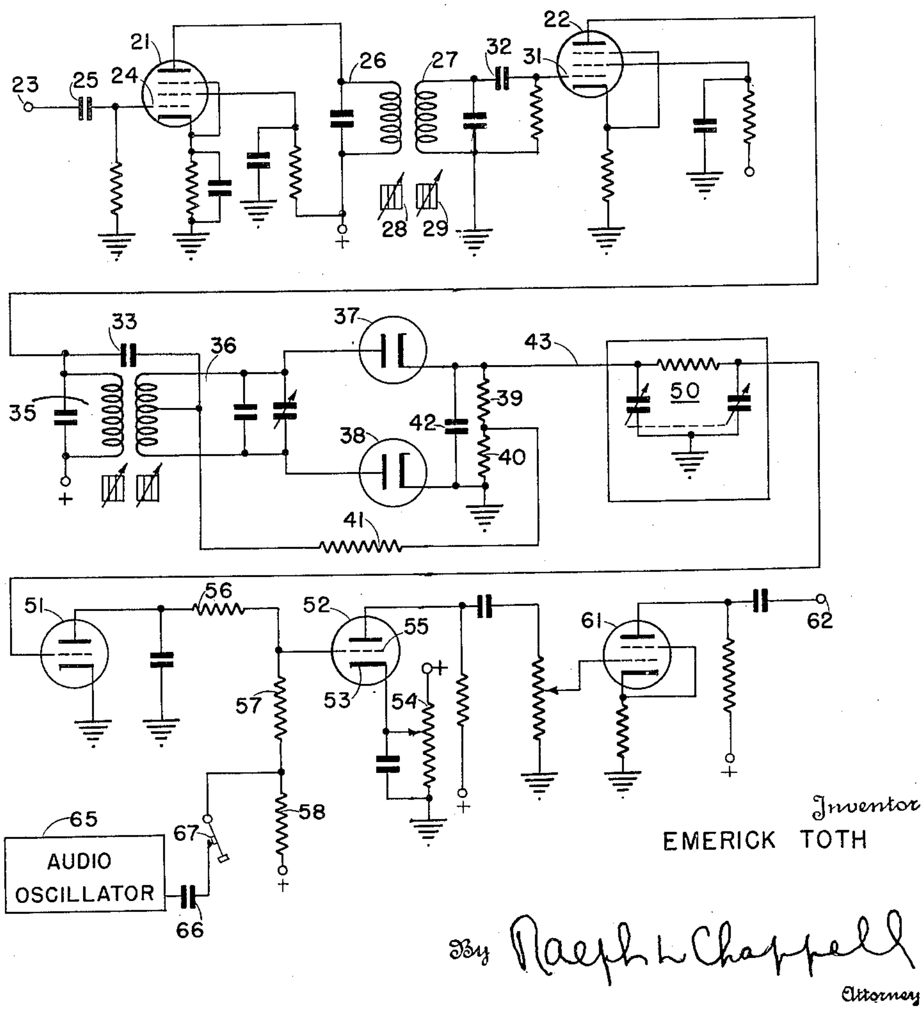

The invention will be further described with reference to the drawings, in which:

Figure 1 shows in block diagram an embodiment of the invention in a radio receiver, Figure 2 shows in circuit diagram a transmission channel embodying the present invention.

The transmission network of the present invention provides high attenuation for broad or continuous frequency distribution noise impulses while passing selected continuous wave frequencies with high efficiency. Such a network is incorporated in the receiver shown in Figure 1.

This receiver is of the superheterodyne type, and includes a preliminary radio frequency amplifier 1 fed from antenna 2. The output of amplifier 1 is mixed with the local oscillator output supplied from oscillator 3 in a mixer stage 4. The beat frequency from mixer 4 is introduced into a tuned intermediate frequency amplifier 5, which drives a frequency discriminator network 6.

The interfering noise impulses are eliminated from the desired signal by operation of the discriminator network.

In a receiver of the type shown in Figure 1, the operating frequency of amplifier 5 is aligned with the intermediate frequency produced by mixer 4. With proper tuning, the signal frequency transmitted by amplifier 5 will coincide therewith.

Discriminator 6 is tuned to the operating frequency of amplifier 5. The zero output frequency of the discriminator centers within the passband of the I-F amplifier. The desired signal frequency will therefore be passed by the discriminator network provided that it is tuned to one side of the overall discriminator response characteristic whereas the noise impulses comprising broadly distributed frequency components will for the most part be symmetrically distributed on either side of the zero output discriminator frequency and are thereby highly attenuated in its output channel due to the balanced structure of the discriminator, which inverts the polarity of rectified voltages below the center frequency as compared to those above center.

The radio receiver shown in Figure 1 embodying the invention is specifically intended for the reception of keyed continuous wave signals. Inasmuch, therefore, as the highest useful frequency passed by discriminator network 6 depends upon the signal keying frequency, output components higher than this may be removed by low-pass filter network 7. The output of filter 7 is a uni-directional pulse type waveform appearing in dependency on the incoming keyed continuous wave signal, but substantially free of noise components. This signal may be employed as desired.

In the circuit of Figure 1, the uni-directional pulse signal from filter 7 is used to key controlled channel 8 so that the output of tone oscillator 9 is fed to transducer 10 during the signal "on" period.

Where exceedingly high level noise impulses are present, it is highly advantageous to limit the maximum amplitude of the signal introduced to the discriminator network 6. For this purpose, the transmission channel preceding the discriminator will therefore incorporate limiting components. Whereas various means for this purpose are known in the art, the circuit of Figure 2 discloses a limiting amplifier which is satisfactory for employment in connection with the invention.

The circuit diagram shown in Figure 2 includes a discriminator network and an amplifying channel arranged for transmitting to the discriminator a desired signal component of a frequency offset from the zero output discriminator frequency so that high level noise impulses accompanying the desired frequency component may be substantially reduced or eliminated in the discriminator output channel. The amplifier and discriminator components shown in Figure 2 may be employed in the receiver of Figure 1, and Figure 2 additionally discloses in circuit diagram a suitable low pass filter and controlled channel such as may be used in the receiving system.

The circuit of Figure 2 is designed to receive desired signal components accompanied by high level noise impulses. Such composite signals are present in many control and communication circuits, and especially in radio circuits. Specifically, the signal introduced in the circuit of Figure 2 may be derived from mixer 4 of the receiving system shown in Figure 1. In this case the series amplifying stages of the circuit of Figure 2 will comprise the intermediate amplifier of the receiver, and for this purpose the amplifier will be tuned to a fixed frequency. The amplifier may comprise the desired number of stages, of which only a pair are fully shown in Figure 2. The amplifying network therefore includes a pair of amplifying tubes, 21 and 22.

The composite input signal is delivered at terminal 23 where it is coupled to grid 24 of tube 21 through coupling condenser 25. Tube 21 is of the pentode type, and is coupled to the succeeding stage through a doubly tuned transformer. The latter comprises a tuned primary 26 and a tuned secondary 27. The transformer may be aligned by adjustable slugs 28 and 29. Secondary 27 is coupled to grid 31 of amplifying tube 22 through coupling condenser 32.

As pointed out above, limiting action may be imposed on the signal preliminary to its introduction in the discriminating network. Where this is desired, it may be incorporated in the amplifier stages by applying low plate and screen grid voltages to the amplifying tubes. Thus, in the circuit of Figure 2, satisfactory limiting action was obtained by employing 6SJ7's with 45 volts on the plates, and 37 volts on the screen grids. In this embodiment the amplifier center frequency was 456 kc./s., the discriminator zero output frequency was 456 kc./s., and the discriminator peak output frequencies were 453 and 459 kc./s.

As an exemplary frequency discriminator network there is shown in Figure 2 a Foster-Seeley circuit. This comprises a conventional discriminator transformer having tuned primary 35 and tuned secondary 36. Secondary 36 is coupled at its center tap to the primary input signal through coupling condenser 33. The transformer network is driven by the anode of the last amplifier tube.

Secondary 36 drives the anodes of diodes 37 and 38, whose cathodes are connected through resistors 39 and 40. The center tap of the output resistor network is coupled to the center tap of secondary 36 through resistance 41. The cathode of diode 38 is grounded, and condenser 42 is connected across the output resistors. In this type of circuit, output channel 43 carries a signal having a polarity and amplitude determined by the frequency of the input signal components.

The zero output frequency for the discriminator network may be slightly offset from the center frequency of the tuned amplifier, although it lies within the amplifier pass band. This may be necessary in order that the broad frequency distribution of the noise impulse may be equally effected by the discriminator characteristic which may be slightly asymmetrical in a practical embodiment so that substantially complete cancellation will be obtained on the introduction of noise impulses through the amplifier channel, or to accommodate differences in band width of the discriminator and amplifier circuits.

The further components known in Figure 2 may be employed in a system as disclosed in Figure 1. Frequency output components higher than the desired signal components may be eliminated by resistance-capacity filter 50. As shown, this comprises a pair of ganged, adjustable capacitors connected across a resistor in series in the output channel 43. The gating circuit comprising the controlled channel includes an inverting stage and a keyed tube.

The negative output impulse signal is inverted in tube 51 and applied to tube 52. Cathode 53 of the latter tube is given a positive bias across resistor 54. Grid 55 of tube 52 is directly coupled to the anode of tube 51 through resistor 56, and is returned to a positive source through series resistors 57 and 58. The positive bias applied to cathode 53 of tube 52 is sufficient to overcome the voltage above ground imposed upon control element 55 of this tube. Under normal operating conditions of tube 51, grid 55 is biased down substantially to cut-off. However, in response to the negative input signal derived from the desired frequency component in the discriminator network, tube 51 is cut off and grid 55 is driven positive to permit conduction of tube 52. Consequently, the output circuit of tube 52 provides an impulse type plate signal from which undesired noise components are completely eliminated.

The output signal from tube 52 is further amplified in tube 61 to provide at terminal 62 a final output channel of the circuit network shown in Figure 2.

Keyed tube 52 may be employed as a gating circuit in order to impose a tone signal on the impulses provided at terminal 62. For this purpose an audio oscillator 65 may be coupled through condenser 66 to the connection between resistors 57 and 58 in the circuit of grid 55 of tube 52. This operation may be employed where it is desired to reproduce the incoming signal aurally. Where it is desired to operate automatic recording apparatus with a high speed input signal the tone oscillator may be disconnected through switch 67 and the uni-directional output signal from terminal 62 employed directly in the following apparatus.

It will be understood that the above described embodiments are for the purpose of illustrating the invention, the scope of which is defined in the appended claims.

The invention described herein may be manufactured and used by or for the Government of the United States of America for governmental purposes without the payment of any royalties thereon or therefor.

What is claimed is:

1. A transmission system comprising a single channel radio receiver for supplying a signal source, said signal source including a keyed continuous wave signal at a single known frequency and noise impulses of broad frequency distribution including said single known frequency, a frequency discriminator having a zero output frequency differently offset from said single known frequency and from the center frequency of said receiver, a single channel feeding said source to said discriminator, and an output channel fed by said discriminator.

2. A system for reducing noise components broadly distributed on both sides of a desired keyed continuous wave signal at a single known frequency comprising a single channel fixed frequency amplifier fed by said single known frequency and said broadly distributed noise components, a frequency discriminator fed by said amplifier channel, and an output channel fed by said discriminator, said frequency discriminator having a zero output frequency differently offset from the single known frequency and the center frequency of the amplifier, an overall frequency within the amplifier band pass and a peak transmission frequency aligned with the single known frequency.

EMERICK TOTH.

REFERENCES CITED

The following references are of record in the file of this patent:

UNITED STATES PATENTS

| Number | Name | Date |
|---|---|---|
| 1,552,829 | De Bellescize | Sept. 8, 1925 |
| 1,559,743 | De Bellescize | Nov. 3, 1925 |
| 2,256,078 | Crosby | Sept. 16, 1941 |
| 2,293,501 | Hansell | Aug. 18, 1942 |

FOREIGN PATENTS

| Number | Country | Date |
|---|---|---|
| 552,943 | Great Britain | Apr. 30, 1943 |